United States Patent
Ojima et al.

(10) Patent No.: US 8,283,082 B2
(45) Date of Patent: Oct. 9, 2012

(54) METHOD OF STARTING OPERATION OF FUEL CELL SYSTEM

(75) Inventors: Kuniaki Ojima, Wako (JP); Satoshi Aoyagi, Shimotsuke (JP)

(73) Assignee: Honda Motor Co., Ltd., Tokyo (JP)

( * ) Notice: Subject to any disclaimer, the term of this patent is extended or adjusted under 35 U.S.C. 154(b) by 622 days.

(21) Appl. No.: 12/399,283

(22) Filed: Mar. 6, 2009

(65) Prior Publication Data
US 2009/0233129 A1    Sep. 17, 2009

(30) Foreign Application Priority Data
Mar. 13, 2008  (JP) .................. 2008-063991

(51) Int. Cl.
*H01M 8/24* (2006.01)
*H01M 8/00* (2006.01)
(52) U.S. Cl. .............. 429/430; 429/400; 429/535
(58) Field of Classification Search .............. 429/430, 429/535
See application file for complete search history.

(56) References Cited

U.S. PATENT DOCUMENTS
6,255,008 B1 * 7/2001 Iwase ................. 429/9
6,577,026 B1 6/2003 Faller et al.

FOREIGN PATENT DOCUMENTS
JP    2002-507049    3/2002
* cited by examiner

*Primary Examiner* — Patrick Ryan
*Assistant Examiner* — Muhammad Siddiquee
(74) *Attorney, Agent, or Firm* — Nelson Mullins Riley & Scarborough LLP; Anthony A. Laurentano

(57) ABSTRACT

A fuel cell system includes a fuel cell, a battery, and a DC/DC converter capable of connecting the fuel cell and the battery on a power feeding circuit. A method of starting operation of the fuel cell system includes the steps of connecting a bypass line connected to a battery for bypassing the DC/DC converter to the power feeding circuit, and directly supplying electrical energy from the battery to an air compressor of an oxygen-containing gas supply apparatus through the bypass line in a state where the fuel cell is disconnected from the power feeding circuit.

4 Claims, 6 Drawing Sheets

METHOD OF STARTING OPERATION OF FUEL CELL SYSTEM

BACKGROUND OF THE INVENTION

1. Field of the Invention

The present invention relates to a method of starting operation of a fuel cell system including a fuel cell for generating electricity using a fuel gas supplied from a fuel gas supply apparatus and an oxygen-containing gas supplied from an oxygen-containing gas supply apparatus, and a DC/DC converter capable of connecting the fuel cell and an energy storage on a power feeding circuit.

2. Description of the Related Art

The fuel cell is a system for obtaining direct current electrical energy by electrochemical reactions of a fuel gas (chiefly hydrogen-containing gas) supplied to an anode and an oxygen-containing gas supplied to a cathode.

The fuel cell is promising for an application to a fuel cell vehicle, i.e., for use in a vehicle such as an automobile. For example, in a known fuel cell system (fuel cell automobile), the fuel cell and a motor driven by an inverter are directly connected, and a DC/DC converter for elevating or lowering the DC voltage is interposed between a point connecting the fuel cell and the motor, and an energy storage. The fuel cell is used as a main power source, and the energy storage is used as an auxiliary power source for assisting the main power source.

In this regard, in a fuel cell disclosed in Japanese Laid-Open Patent Publication No. 2002-507049 (PCT), as shown in FIG. 6, an accumulator (battery) 1 is connected to a circuit network 3 through one or more DC/DC converter 2. A fuel cell (FC) 4 and auxiliary devices 5 such as a compressor are connected to the circuit network 3.

The accumulator 1 is charged in rated operation of the fuel cell 4, and energy is transmitted from the accumulator 1 to the circuit network 3 for supplying energy required for start-up operation. Operation of the DC/DC converter 2 is switched by a control device 6.

However, in Japanese Laid-Open Patent Publication No. 2002-507049 (PCT), in order to start operation of the fuel cell 4, an air pump (auxiliary device 5) is operated, and at this time, the accumulator 1 supplies energy to the circuit network 3 through the DC/DC converter 2. Therefore, energy losses occur in the DC/DC converter 2.

Further, the accumulator 1 needs to have a relatively large size for supplying sufficient energy to the air pump. Further, if any failure occurs in the DC/DC converter 2, it is not possible to start operation of the fuel cell 4.

SUMMARY OF THE INVENTION

The present invention has been made to solve the above problems, and an object of the present invention is to provide a method of starting operation of a fuel cell system in which, at the time of starting operation of the fuel cell system, electrical energy is directly supplied to an air pump bypassing a DC/DC converter, and operation of a fuel cell system is started easily and reliably.

The present invention relates to a method of starting operation of a fuel cell system, and the fuel cell system includes a fuel cell for generating electricity by electrochemical reactions of a fuel gas supplied from a fuel gas supply apparatus and an oxygen-containing gas supplied from an oxygen-containing gas supply apparatus, and a DC/DC converter capable of connecting the fuel cell and an energy storage on a power feeding circuit.

The method includes the steps of connecting a bypass circuit connected to the energy storage for bypassing the DC/DC converter to the power feeding circuit, and directly supplying electrical energy from the energy storage to an air pump of an oxygen-containing gas supply apparatus through the bypass circuit in a state where the fuel cell is disconnected from the power feeding circuit.

In the present invention, at the time of starting operation of the fuel cell system, the energy storage is directly connected to the power feeding circuit through the bypass circuit, bypassing the DC/DC converter. Therefore, in the state where the DC/DC converter is stopped, electrical energy can be supplied directly from the energy storage to the air pump. Thus, switching losses in the DC/DC converter can be avoided, and improvement in the efficiency is achieved. Accordingly, electrical energy is efficiently supplied from the energy storage to the air pump, and size reduction of the energy storage is achieved easily.

Further, even if any failure occurs in the DC/DC converter, since the energy storage is connected to the air pump bypassing the DC/DC converter, regardless of whether the DC/DC converter has any failure, operation of the fuel cell system is reliably started, and improvement in the performance of starting operation is achieved.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
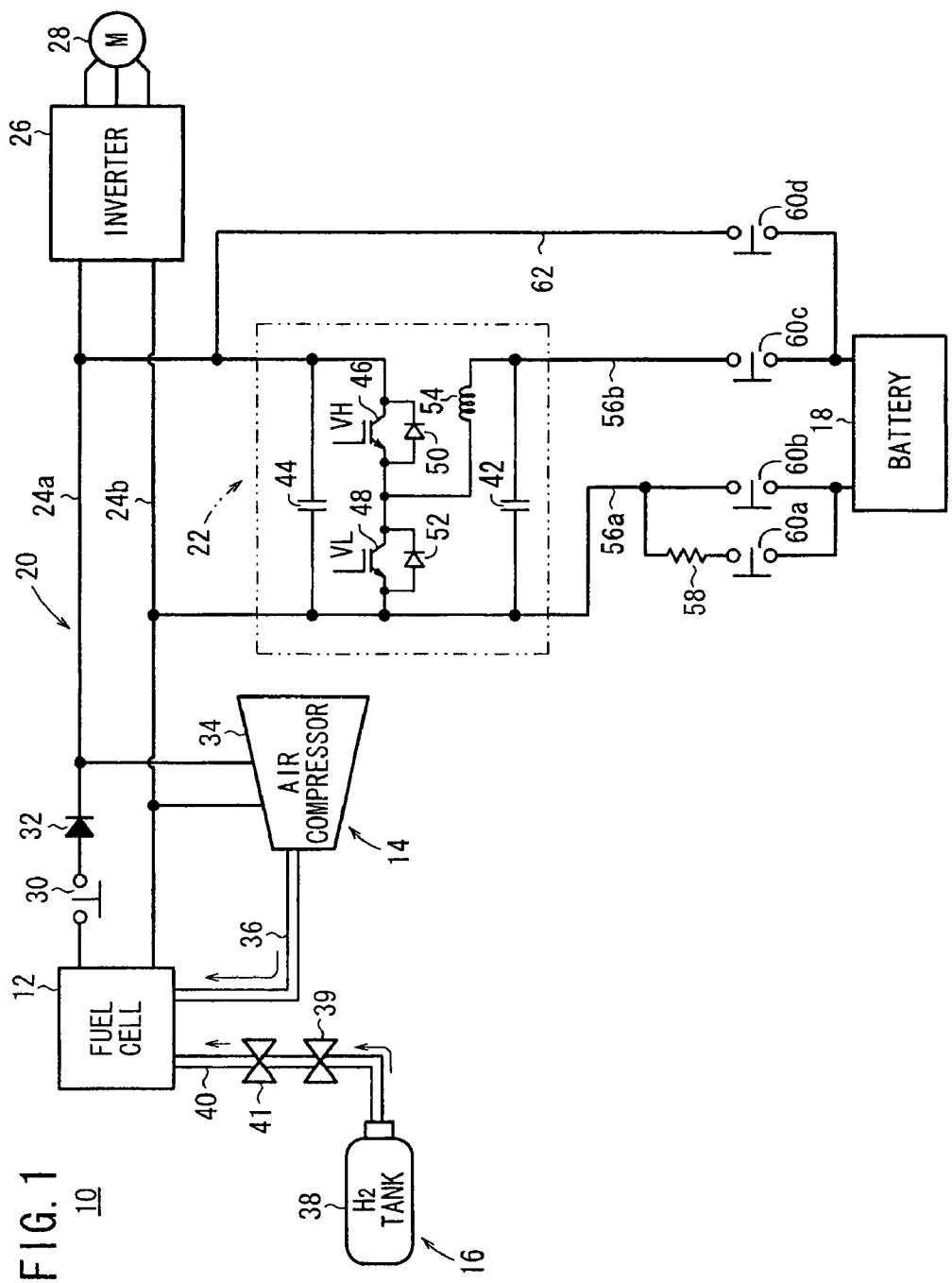
FIG. 1 is a diagram schematically showing a fuel cell system mounted in a vehicle to which a method of starting operation according a first embodiment of the present invention is applied.

FIG. 1 is a diagram schematically showing a structure of a fuel cell system 10 mounted in a vehicle to which a method of starting operation according to a first embodiment of the present invention is applied.

The fuel cell system 10 includes a fuel cell 12, an oxygen-containing gas supply apparatus 14 for supplying an oxygen-containing gas to the fuel cell 12, a fuel gas supply apparatus 16 for supplying a fuel gas to the fuel cell 12, a coolant supply apparatus (not shown) for supplying a coolant to the fuel cell 12, an energy storage (hereinafter referred to as a battery) 18, and an DC/DC converter 22 capable of connecting the fuel cell 12 and the battery 18 on a power feeding circuit 20.

The fuel cell 12 and the DC/DC converter 22 are connectable to an inverter 26 through bus lines 24a, 24b of the power feeding circuit 20. Electrical current (electrical energy) is supplied to a drive motor (electric motor) 28 for running of the vehicle through the inverter 26.

Though not shown, the fuel cell 12 has a stack structure formed by stacking a plurality of power generation cells. Each of the power generation cells is formed by sandwiching a membrane electrode assembly between separators. The membrane electrode assembly includes an anode, a cathode, and a solid polymer electrolyte membrane interposed between the anode and the cathode. The fuel cell 12 is connectable to and disconnectable from the bus line 24a through a contactor 30 and a diode 32.

The oxygen-containing gas supply apparatus 14 has an air compressor (air pump) 34 for compressing the atmospheric air, and supplying the compressed air. The air compressor 34 is provided in an air supply channel 36. The air supply channel 36 is connected to an oxygen-containing gas supply passage (not shown) of the fuel cell 12. The air compressor 34 is connected to the bus lines 24a, 24b.

The fuel gas supply apparatus 16 has a hydrogen tank 38 for storing high pressure hydrogen (hydrogen-containing gas). The hydrogen tank 38 has an outlet connected through an interruption valve 39 to a fuel gas supply passage (not shown) of the fuel cell 12 in a hydrogen supply channel 40. A pressure regulator valve 41 is also provided in the hydrogen supply channel 40, at a position downstream of the interruption valve 39.

The DC/DC converter 22 has a primary capacitor 42 and a secondary capacitor 44 as smoothing capacitors. The DC/DC converter 22 is formed as an arm including an upper arm element 46 and a lower arm element 48 of switching elements such as IGBT. The arm elements 46, 48 are connected to their respective diodes 50, 52 (anti-parallel diodes) placed in parallel oppositely to each other.

A single reactor 54 for releasing and storing energy at the time of voltage conversion between the primary side voltage and the secondary side voltage by the DC/DC converter 22 is inserted between a middle point of the arms and the battery 18.

The upper arm element 46 is turned on by (high level of) a gate drive signal (drive voltage) VH, and the lower arm element 48 is turned on by (high level of) a gate drive signal (drive voltage) VL.

The battery 18 is connected to the primary side of the DC/DC converter 22 through power lines 56a, 56b. For example, a lithium ion secondary battery or a capacitor can be utilized as the battery 18. A contactor 60a having a resistor 58 and a contactor 60b are provided in parallel in the power line 56a. A contactor 60c is provided in the power line 56b.

A bypass line (bypass circuit) 62 connectable to the bus line 24a of the power feeding circuit 20 is provided for the battery 18, bypassing the DC/DC converter 22. A contactor 60d is provided in the bypass line 62.

An inverter 26 performs DC/AC conversion, supplies motor current to the drive motor 28, and supplies motor current after AC/DC conversion resulting from regenerating operation, from the secondary side to the primary side through the DC/DC converter 22. The secondary side voltage as the regenerative voltage or the power generation voltage is converted to the primary side voltage having a low voltage value by the DC/DC converter 22.

Operation of the fuel cell system 10 will be described in connection with a method of starting operation according to the first embodiment with reference to a timing chart shown in FIG. 2.

When an ignition (not shown) of the fuel cell system 10 is placed in the ON state, a start-up sequence of the fuel cell system 10 is started. For this purpose, firstly, the contactor 60a is turned on (connected), and the contactor 60d is tuned on to connect the battery 18 to the bus line 24a through the bypass line 62. Thus, energy from the battery 18 is stored (precharged) in the secondary capacitor 44 of the DC/DC converter 22. At this time, overcurrent does not flow through the contactor 60a since the contactor 60a has the resistor 58.

Figure 2:
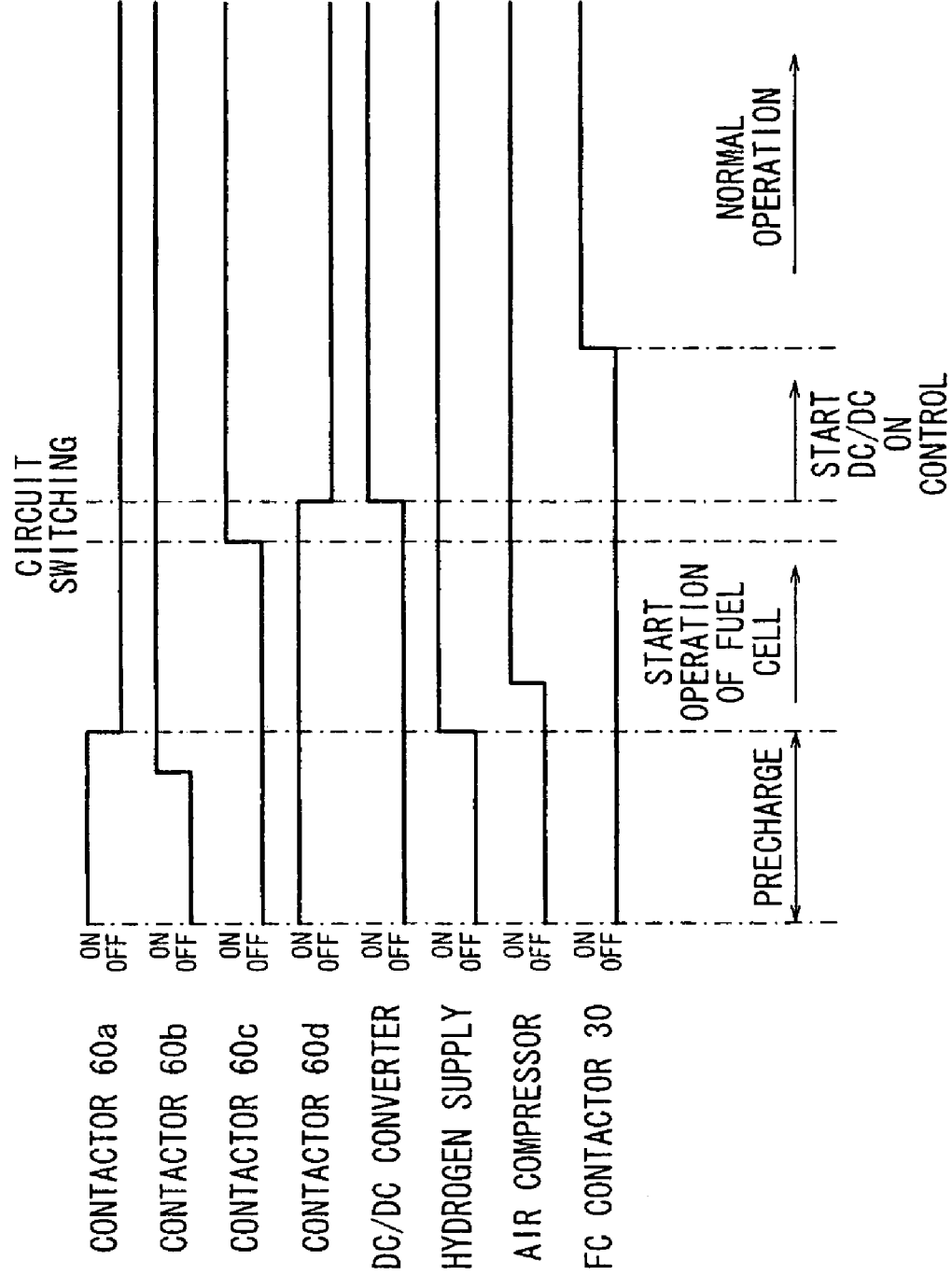
FIG. 2 is a timing chart explaining the operation starting method.
Figure 3:
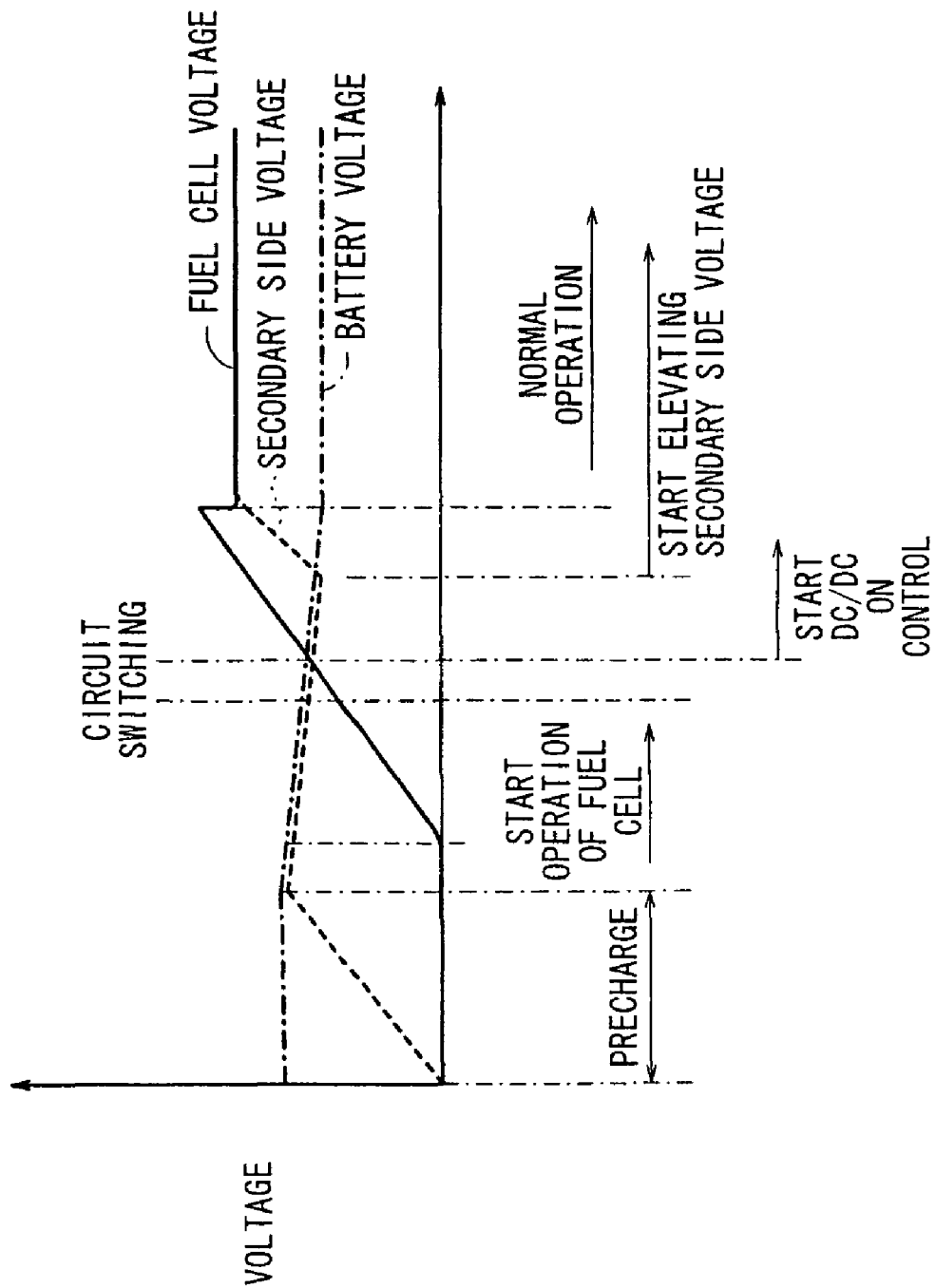
FIG. 3 is a graph explaining voltage change in the operation starting method.

As shown in FIG. 3, by the precharging process, the voltage of the secondary capacitor 44 (hereinafter also referred to as a secondary side voltage) is elevated to the voltage of the battery 18 (battery voltage). As shown in FIG. 2, during the precharging process, after the contactor 60b is turned on, the contactor 60a is turned off (disconnected).

After completion of the precharging process, in the fuel gas supply apparatus 16, the interruption valve 39 is operated to supply the fuel gas from the hydrogen tank 38 to the fuel cell 12 through the hydrogen supply channel 40. After the supply of the fuel gas to the fuel cell 12 is started, and after elapse of a period of time which is set as necessary, the air compressor 34 of the oxygen-containing gas supply apparatus 14 is operated.

Therefore, the air as the oxygen-containing gas is supplied to the fuel cell 12 through the air supply channel 36. Thus, in the fuel cell 12, the fuel gas is supplied to the anode and the air is supplied to the cathode for generating electricity. That is, operation of the fuel cell 12 is started.

After the output voltage (FC voltage) of the fuel cell 12 is elevated to a predetermined voltage, the contactor 60c is turned on, and the contactor 60d is turned off for switching the circuit (see FIGS. 2 and 3). Then, by implementing the ON control of the DC/DC converter 22, the output voltage (primary side voltage) of the battery 18 is elevated to a predetermined output voltage (secondary side voltage) by the action of the DC/DC converter 22.

Further, after the output voltage of the fuel cell 12 and the secondary side voltage of the DC/DC converter 22 become substantially the same, or after the voltage difference between the output voltage of the fuel cell 12 and the secondary side voltage of the DC/DC converter 22 falls within a predetermined range, the contactor 30 is turned on. As a result, electrical current (electricity) is supplied from the fuel cell 12 to the drive motor 28 through the inverter 26, and electricity is supplied to the air compressor 34.

The output voltage of the fuel cell 12 may be higher than the secondary side voltage of the DC/DC converter 22 or the secondary side voltage may be higher than the output voltage, on the condition that the output voltage of the fuel cell 12 and the secondary side voltage of the DC/DC converter 22 become substantially the same, or that the voltage difference between the output voltage and the secondary side voltage falls within a predetermined range. It is because, if the output voltage of the fuel cell 12 and the secondary side voltage of the DC/DC converter 22 become substantially the same, or if the voltage difference between the output voltage of the fuel cell 12 and the secondary side voltage of the DC/DC converter 22 falls within a predetermined range, adhesion of the contact point of the contactor due to melting is prevented. Further, the voltage difference of the predetermined range depends on the electric current and characteristics of the contactor 30. Normally, the voltage difference is 120V or less, and preferably, 90V or less.

In the first embodiment, at the time of starting operation of the fuel cell system 10, firstly, the battery 18 is directly connected to the power feeding circuit 20 through the bypass line 62, bypassing the DC/DC converter 22. Therefore, in the state where the DC/DC converter 22 is stopped, electrical energy can be directly supplied from the battery 18 to the air compressor 34.

Thus, switching losses due to the DC/DC converter 22 can be avoided, and improvement in the efficiency is achieved. Accordingly, electrical energy is directly supplied from the battery 18 to the air compressor 34, and size reduction of the battery 18 is achieved easily.

Figure 4:
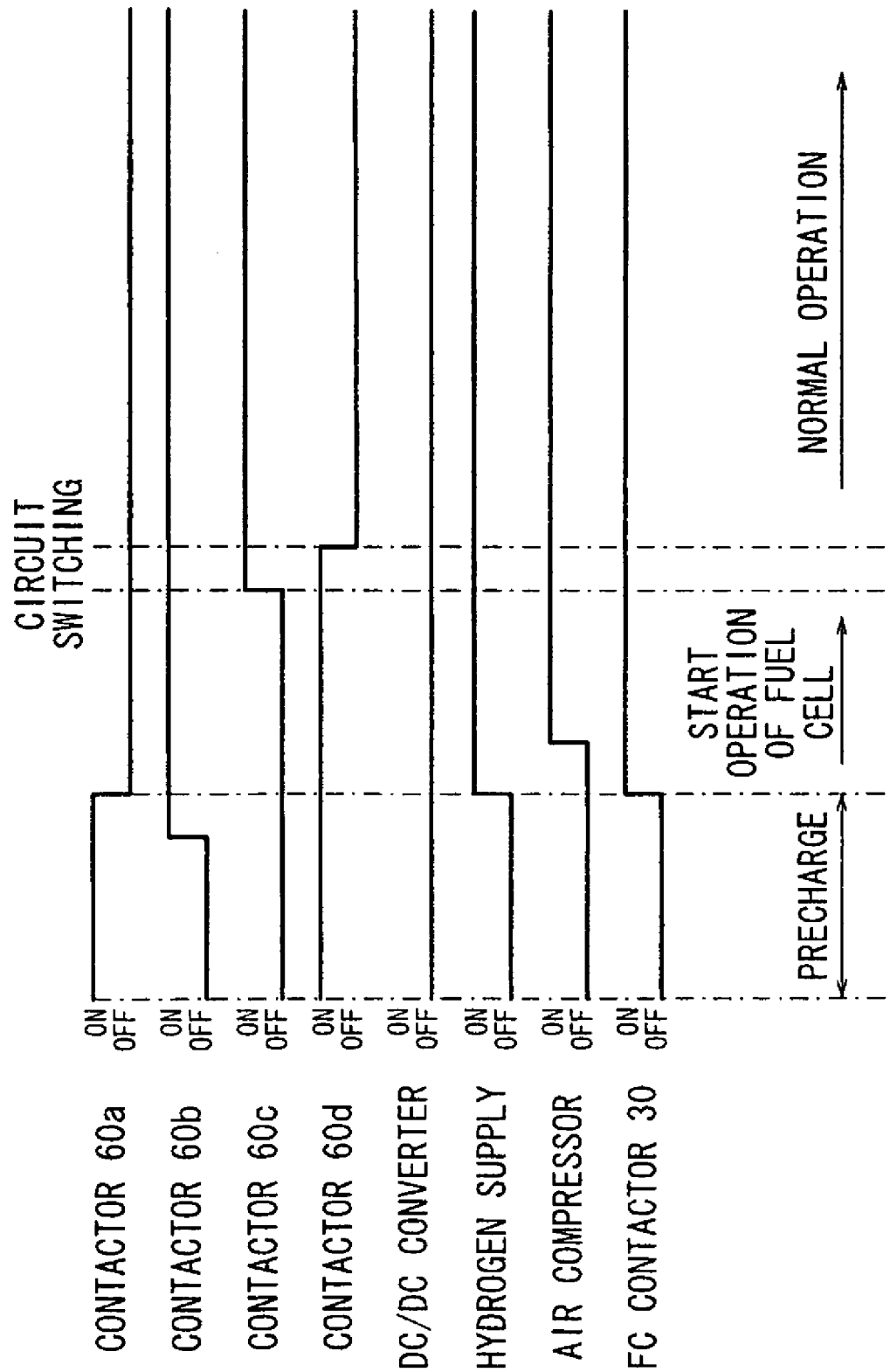
FIG. 4 is a timing chart explaining an operation starting method according to a second embodiment of the present invention.
Figure 5:
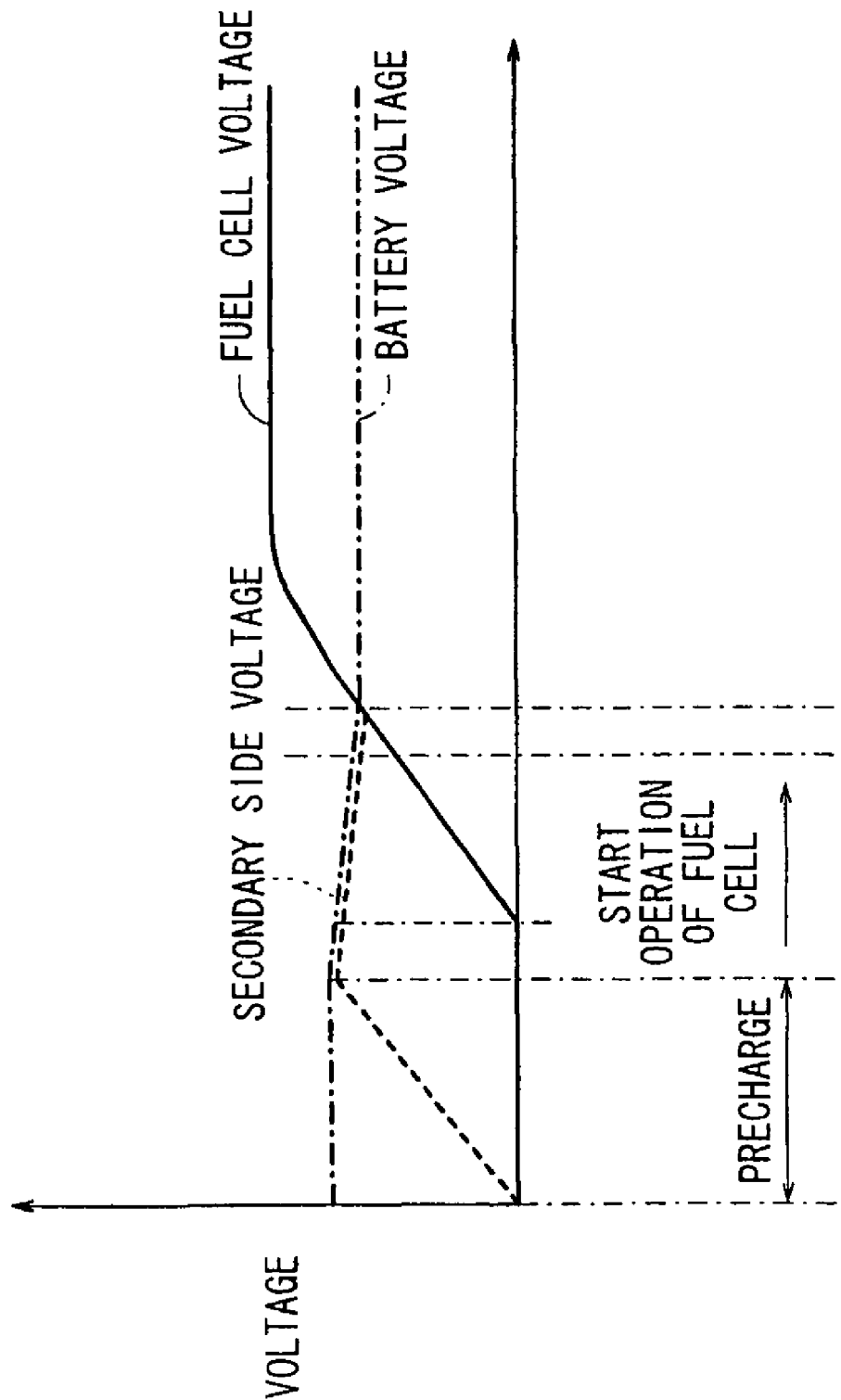
FIG. 5 is a graph explaining voltage change in the operation starting method.
Figure 6:
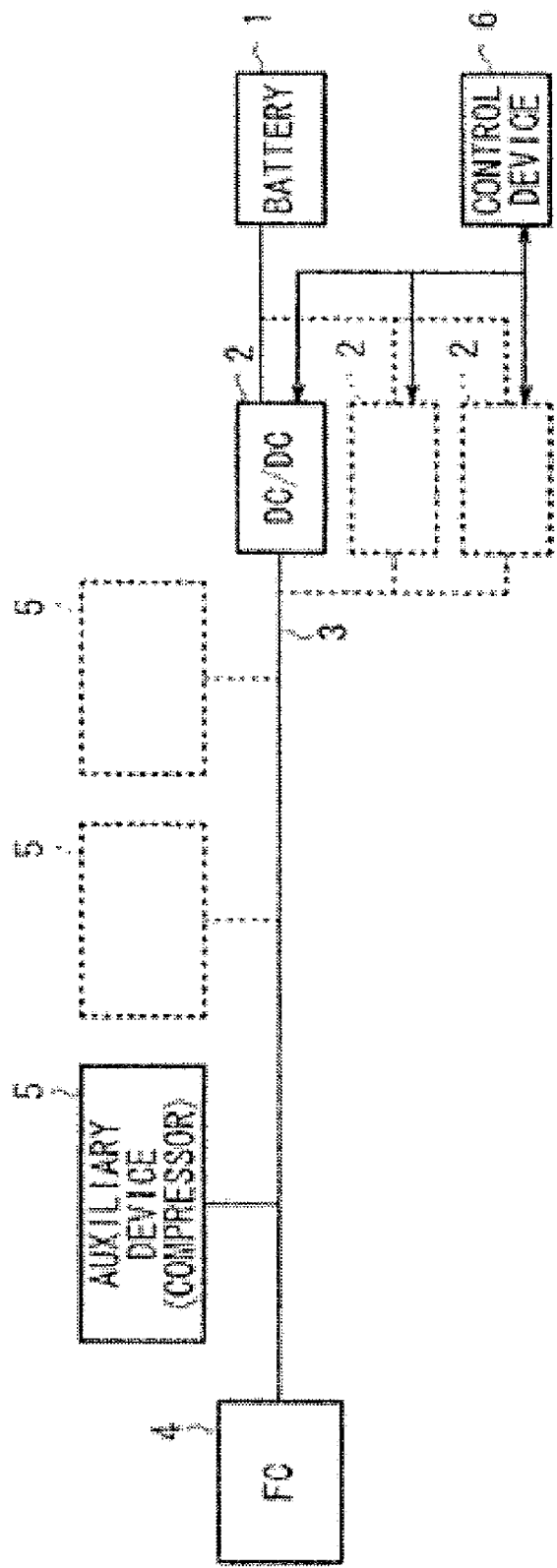
FIG. 6 is a diagram explaining a fuel cell disclosed in Japanese Laid-Open Patent Publication No. 2002-507049 (PCT).

FIG. 4 is a timing chart explaining an operation starting method according to a second embodiment of the present invention. As in the case of the first embodiment, the second embodiment uses the fuel cell system 10. The second embodiment is applicable to a case where operation of the DC/DC converter 22 cannot be performed due to a failure or the like.

In the second embodiment, firstly, the contactors 60a, 60b are turned on to start precharging of the secondary capacitor 44 of the DC/DC converter 22. Then, after the contactor 60b is turned on, the contactor 60a is turned off to finish precharging. When the contactor 60a is turned off, the contactor 30 at the outlet of the fuel cell 12 is turned on to connect the fuel cell 12 to the power feeding circuit 20.

Further, the fuel gas supply apparatus 16 and the oxygen-containing gas supply apparatus 14 are operated to start operation of the fuel cell 12. Then, after the contactor 60c is turned on, the contactor 60d is turned off to perform operation of the fuel cell system 10 by electrical energy supplied from the fuel cell 12.

As described above, in the second embodiment, even if any failure occurs in the DC/DC converter 22, the battery 18 is connected to the air compressor 34 bypassing the DC/DC converter 22, and the electrical energy is supplied to the air compressor 34. Thus, regardless of whether the DC/DC converter 22 has any failure, operation of the fuel cell 12 is reliably started, and improvement in the performance of starting operation of the fuel cell system 10 is achieved.

Further, if both of the DC/DC converter 22 and the fuel cell 12 have failures, by maintaining the contactors 60a, 60b to be in the ON state, running of the vehicle can be achieved only by electrical energy from the battery 18.

The present invention is not limited to the above embodiments and various arrangements can be adopted without departing from the gist of the present invention.

What is claimed is:

1. A method of starting operation of a fuel cell system, the fuel cell system including:
   a fuel cell for generating electricity by electrochemical reactions of a fuel gas supplied from a fuel gas supply apparatus and an oxygen-containing gas supplied from an oxygen-containing gas supply apparatus; and
   a DC/DC converter capable of connecting the fuel cell and an energy storage on a power feeding circuit, the method comprising the steps of:
   connecting a bypass circuit connected to the energy storage, for bypassing the DC/DC converter, to the power feeding circuit; and
   directly supplying electrical energy from the energy storage to an air pump of the oxygen-containing gas supply apparatus through the bypass circuit during a startup operation of the fuel cell system in a state where the fuel cell is disconnected from the power feeding circuit.

2. A method of starting operation according to claim 1, further comprising the steps of:
   elevating a secondary side voltage of the DC/DC converter by operating the DC/DC converter in a state where the energy storage is connected to a primary side of the DC/DC converter; and
   connecting the fuel cell to the power feeding circuit when the secondary side voltage of the DC/DC converter and an output voltage of the fuel cell become substantially the same.

3. A method of starting operation according to claim 1, further comprising the step of precharging the DC/DC converter from the energy storage in a state where the bypass circuit is connected to the power feeding circuit and a precharging contactor of the DC/DC converter is connected.

4. A method of starting operation according to claim 3, further comprising the step of, if the DC/DC converter is not operable, at the time of disconnecting the precharging contactor, connecting the fuel cell to the power feeding circuit.

* * * * *